US006137398A

United States Patent [19]

Dunlap et al.

[11] Patent Number: 6,137,398

[45] Date of Patent: Oct. 24, 2000

[54] DEVICE FOR A MATERIALS HANDLING VEHICLE

[75] Inventors: Danny L. Dunlap, Minster; Patrick A. Soder, Sidney; John A. Turner, New Bremen, all of Ohio; Martin E. Romer, Greencastle, Ind.; Daniel W. Kahlig, Fort Recovery; Larry A. Niemeyer, New Knoxville, both of Ohio

[73] Assignee: Crown Equipment Corporation, New Bremen, Ohio

[21] Appl. No.: 09/115,051

[22] Filed: Jul. 14, 1998

Related U.S. Application Data

[60] Provisional application No. 60/052,687, Jul. 16, 1997.

[51] Int. Cl.[7] .......... B60Q 1/00

[52] U.S. Cl. .......... 340/439; 340/573.1; 340/665; 180/273

[58] Field of Search .......... 340/439, 438, 340/573.1, 576, 665, 666, 686.1; 180/273, 272, 274

[56] References Cited

U.S. PATENT DOCUMENTS

| | | | |
|---|---|---|---|
| 3,266,032 | 8/1966 | Bühler | 340/286.01 |
| 3,769,481 | 10/1973 | Raab | 200/518 |
| 4,317,500 | 3/1982 | Bening | 180/273 |
| 4,347,910 | 9/1982 | Deguara | 180/268 |
| 4,630,700 | 12/1986 | Larsson | 180/89.13 |
| 4,840,248 | 6/1989 | Silverman | 180/272 |
| 5,579,859 | 12/1996 | Quellhorst et al. | 180/89.13 |
| 5,586,620 | 12/1996 | Dammeyer et al. | 187/227 |

FOREIGN PATENT DOCUMENTS

| | | |
|---|---|---|
| 08 013544 | 1/1996 | Japan . |
| 1 382 822 | 3/1988 | Russian Federation . |
| 719 964 | 3/1990 | Russian Federation . |

*Primary Examiner*—Daniel J. Wu
*Assistant Examiner*—Sihong Huang
*Attorney, Agent, or Firm*—King and Schickli PLLC

[57] ABSTRACT

A materials handling vehicle is provided with a frame including an operator's compartment having an entrance, a drive mechanism supported on the frame, a material handling unit coupled to the frame, and a device including an actuator located across the threshold of the entrance of the operator's compartment. The device generates an alert signal when a portion of an operator's body engages the actuator.

18 Claims, 8 Drawing Sheets

DEVICE FOR A MATERIALS HANDLING VEHICLE

CROSS-REFERENCE TO RELATED APPLICATION

This application claims the benefit of U.S. Provisional Application No. 60/052,687, filed Jul. 16, 1997 and entitled OPERATOR COMPARTMENT THRESHOLD SWITCH, which is incorporated herein by reference.

BACKGROUND OF THE INVENTION

This invention relates to a materials handling vehicle such as a lift truck and, more particularly, to such a vehicle having a device to prevent an operator from operating the vehicle outside the prescribed operator position during aberrant operation of the vehicle.

A typical materials handling vehicle such as a lift truck includes a frame having an operator's compartment with an entrance, a drive mechanism supported on the frame, and a material handling unit coupled to the frame. The drive mechanism may include an electric motor which drives one or more wheels. The material handling unit may comprise a mast assembly supporting lift forks.

During operation of such a vehicle, an operator, who may be standing or sitting within the operator's compartment, may place his/her foot on a ledge portion of the frame which defines a base of the entrance into the operator's compartment.

SUMMARY OF THE INVENTION

In accordance with the present invention, a device is provided for an operator of a materials handling vehicle to keep the operator within the confines of the vehicle during operation. The device comprises an actuator bar placed at a base of an entrance into the operator's compartment. Preferably, the actuator bar extends across substantially the entire width of the base of the entrance. When the operator's foot engages the actuator bar, the bar is depressed due to the weight of the foot. The depressed bar causes one or more switches to be actuated and an alert device to be activated. The alert device may comprise a lamp, an apparatus for making an audible signal, such as a beeping sound, or a combination of the two. It is also contemplated that some action such as reducing the speed of the vehicle by, for example, shutting down power to a drive wheel or wheels and allowing the vehicle to coast to a stop, may be taken in response to the actuator bar being depressed. It is further contemplated that power may be reduced or limited to the drive wheel or wheels such that the vehicle slows down to a maximum speed of about 1.5 miles per hour.

Other objects and advantages of the invention will be apparent from the following description, the accompanying drawings and the appended claims.

DESCRIPTION OF THE PREFERRED EMBODIMENT

Figure 1:
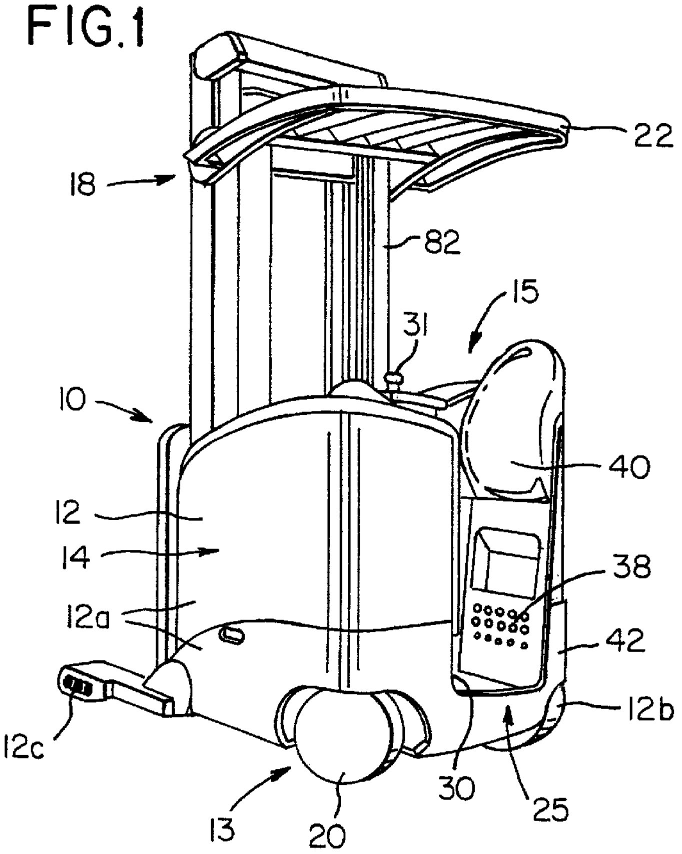
FIG. 1 is a perspective view of a typical fork lift truck incorporating the present invention.

Reference is now made to FIG. 1 which shows a materials handling vehicle 10 in which the present invention is incorporated. The vehicle comprises, in the illustrated embodiment, a rider reach fork lift truck. The truck 10 includes a frame 12, a drive mechanism 13 supported on the frame 12, and a material handling unit 18 coupled to the frame 12. The drive mechanism 13 includes a power unit 14 which houses a battery (not shown) for supplying power to a traction motor (not shown) connected to a steerable wheel 20 and to hydraulic motors (not shown) which supply power to several different systems. The frame 12 includes a main body portion 12*a*, a caster wheel 12*b* mounted at the right rear of the main body portion 12*a* and a pair of outrigger wheel assemblies 12*c* mounted at the forward part of the main body portion 12*a*.

Figure 1A:
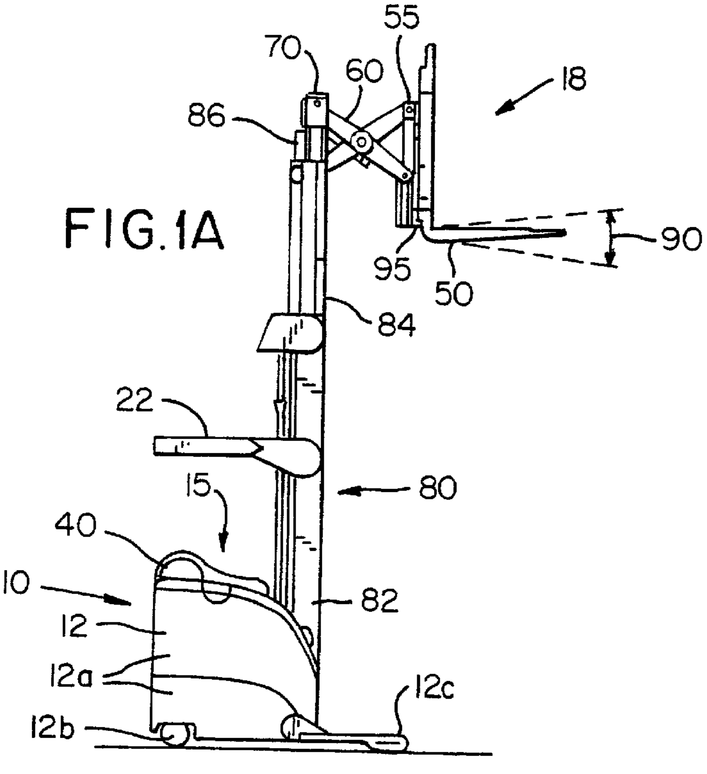
FIG. 1A is a side elevational view of the fork lift truck of FIG. 1.

The main body portion 12*a* of the frame 12 includes an operator's compartment 15 defined by a floor 32 covered by a rubber mat 33, a first side wall 34, a front wall 36, a rear wall 38, which may also include a back rest 40 or a seat, see FIGS. 1 and 1A, and a second side wall 42. An opening 42*a* is provided in the second side wall 42 so as to define an entrance 30 into the compartment 15.

The material handling unit 18 includes an overhead guard 22, a pair of forks 50 mounted on a fork carriage mechanism 55 which is in turn mounted on a reach mechanism 60 on a vertical carriage assembly 70. As described in U.S. Pat. No. 5,586,620, which is incorporated herein by reference, the assembly 70 is attached to an extensible mast assembly 80, which includes a fixed, lower mast member 82 and nested movable mast members 84 and 86.

The operator's compartment 15 is provided with a steering tiller 31, see FIG. 1, for controlling the direction of travel of the truck 10, and a control handle (not shown) for controlling travel speed and direction (front/rear) as well as fork height, extension, tilt and side shift.

Hydraulic cylinders (not shown) are operated by the control handle to control the height of the forks 50 which are shown raised in FIG. 1A. The forks may be tilted through a range shown by the arrow 90 by means of a hydraulic cylinder 95 located between the forks 50 and the fork carriage mechanism 55. The forks may also be moved from side to side by a side shift mechanism (not shown).

Figure 2:
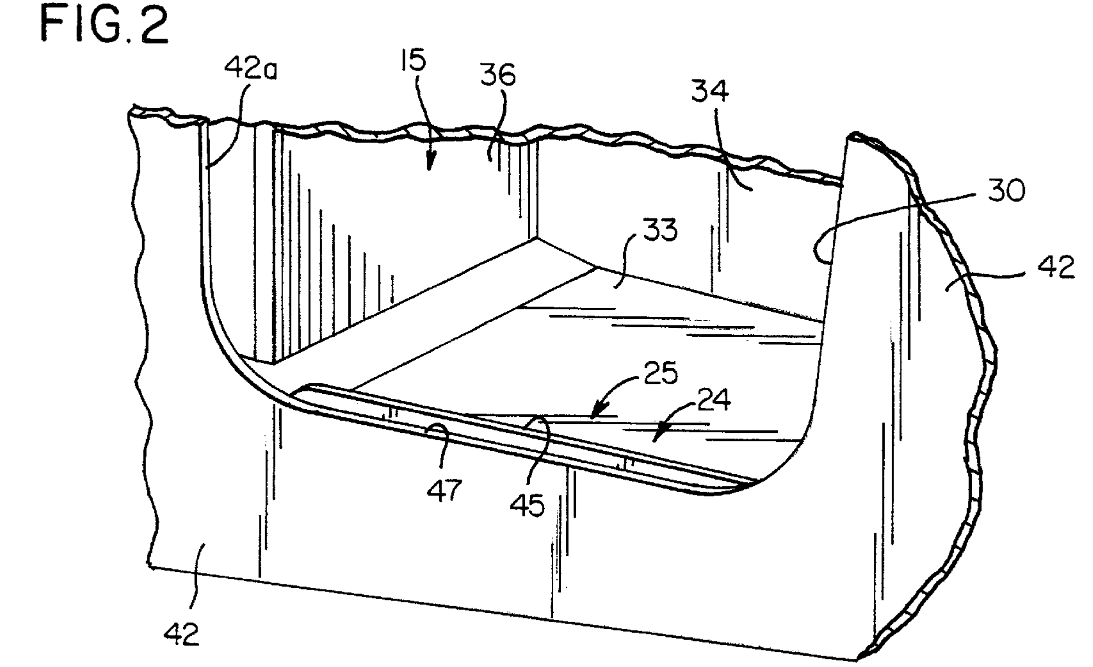
FIG. 2 is a perspective view of the lower part of the operator's compartment of the fork lift truck of FIG. 1 showing an actuator bar located at the base of the entrance thereto.

In the present invention, an entrance device 24 including an entry switch 25 is located at the entrance 30 to the operator's compartment 15. The switch 25 includes an actuator bar 45 that extends from about ⅛ inch to about ½ inch above an entry ledge 47 forming a base of the entrance 30, see FIGS. 2 and 3. When an operator's foot is placed on the ledge 47, the actuator bar 45 is depressed due to the weight of the foot. The depressed bar 45 causes one or more switches (to be discussed below) to be actuated and an alert device (to be discussed below) to be activated. The alert device also forms part of the device 24. It can take several forms, such as a device for reducing the speed of the truck, sounding an audible signal, flashing a light, or performing any combination of these actions or performing some other appropriate action. The speed of the truck 10 may be reduced by shutting down power to the driven wheel 20 and allowing the truck 10 to coast to a stop. A device for creating an audible sound, such as a beeping sound, may be activated simultaneously with the shutting down of power to the driven wheel 20. It is also contemplated that power may be reduced or limited to the driven wheel such that the vehicle slows down to a slow speed, e.g., 1.5 miles per hour, at which point a limited amount of power is provided to the driven wheel so as to maintain the vehicle moving at the slow speed. It is preferred that the truck's braking device (not shown) not be activated in response to depression of the bar 45 so that the entry switch 25 is not used as a brake by the operator.

Figure 3:
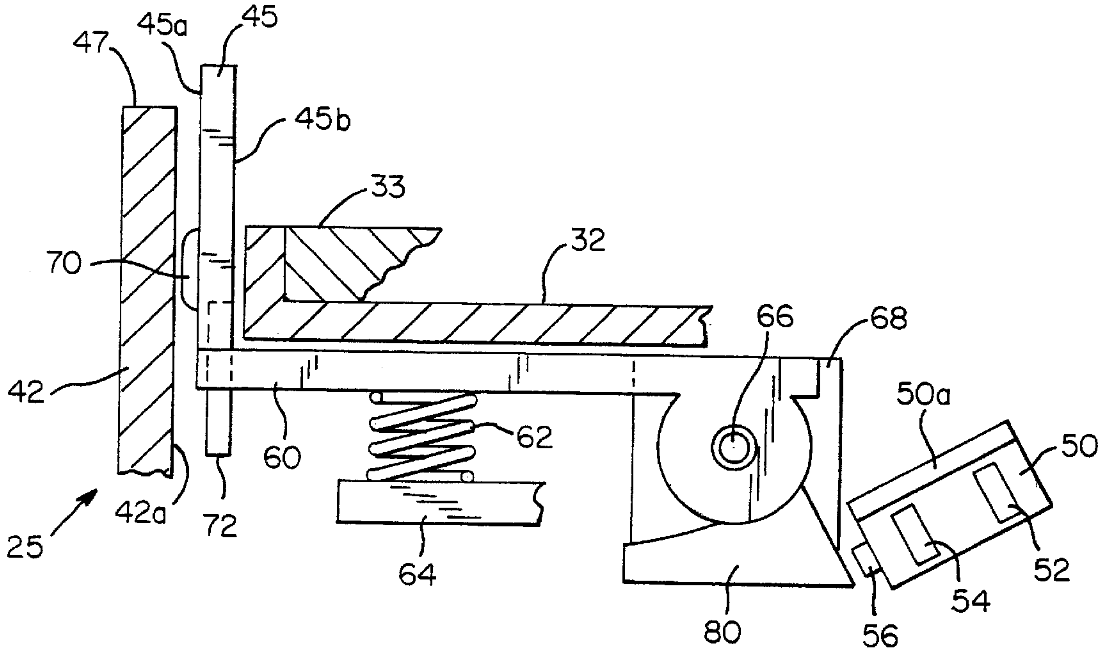
FIG. 3 is a cross-sectional view of a first embodiment of the present invention showing the actuator bar located between the floor of the operator's compartment and the second side wall of the vehicle.
Figure 4:
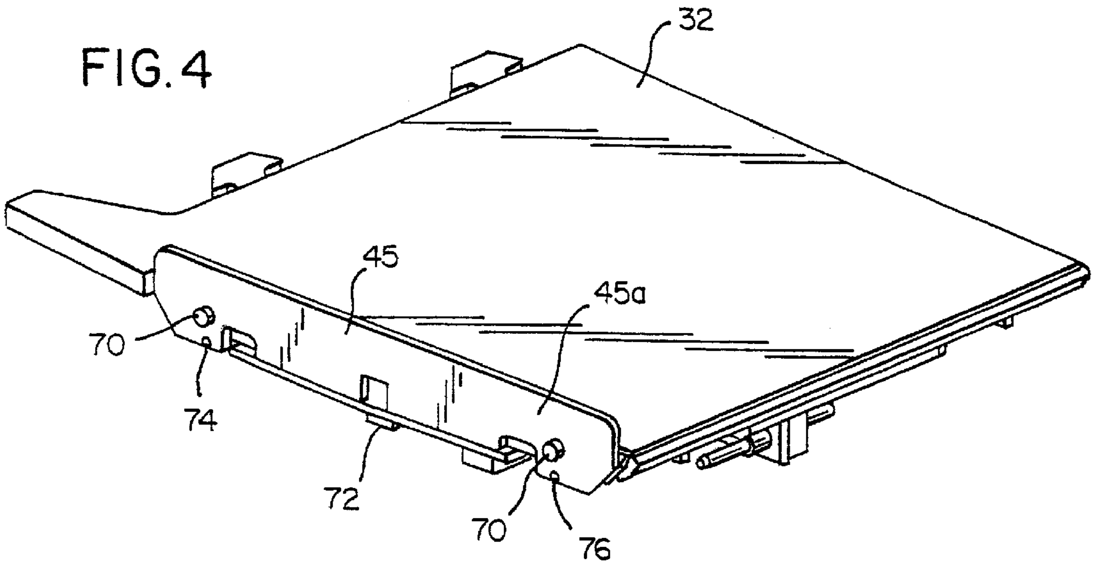
FIG. 4 is a perspective view from above the floor showing the relationship between the floor of the operator's compartment and the actuator bar.
Figure 5:
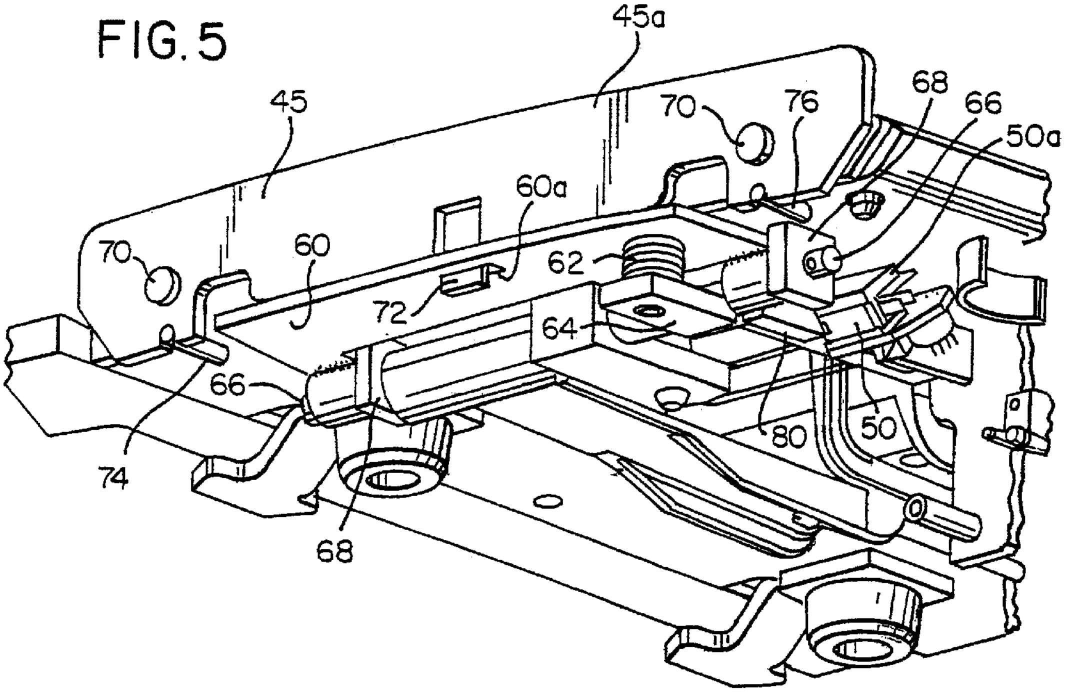
FIG. 5 is a perspective view from below the floor showing the actuator bar and switch assembly.

As shown in FIGS. 3–5, in addition to the actuator bar 45, the entry switch 25 includes a normally closed micro switch 50, see FIG. 3, which is provided with a pair of electrical contacts 52, 54 and a push button 56. The micro switch 50 is coupled to a bracket 50*a* of the floor 32. A plate 60 is biased upwardly by a spring 62 supported on a bracket 64 and pivoted about a shaft 66 which in turn is supported by brackets 68, see FIGS. 3 and 5. The actuator bar 45 is loosely supported on the plate 60 and is guided by a pair of bearings or buttons 70 on its outer surface 45*a*, which provide a substantially friction-free contact with the inner surface 42*a* of the second side wall 42. The bar 45 is guided on its inner surface 45*b* by the floor 32. A tab 72 is weldably connected to the actuator bar 45 and extends through an opening 60*a* in the plate 60 so as to limit side-to-side movement of the bar 45. Posts 74 and 76 are also weldably connected to the bar 45 and engage the lower surface of floor 32 so as to limit upward movement of the bar 45.

In operation, if the foot of the operator is placed on the ledge 47, it will cause the actuator bar 45 to move downwardly. Downward movement of the bar 45 rotates the plate 60 about the shaft 66 and against the upward bias provided by the spring 62. This rotation causes the arm 80 to push the button 56 inwardly, opening the contacts of the micro switch 50. Because the upward extension of the actuator bar 45 is only slightly higher than the ledge 47, the actuator bar 45 is not a trip point, but the pressure of the operator's foot on the bar 45 will nevertheless cause the alert device to be triggered.

Figure 6:
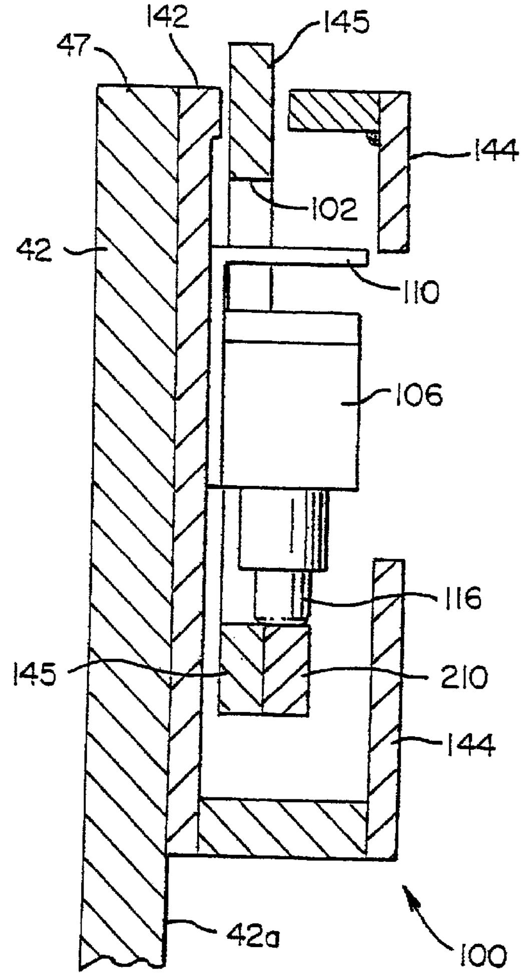
FIG. 6 is a cross-sectional view of a second embodiment of the present invention.
Figure 11:
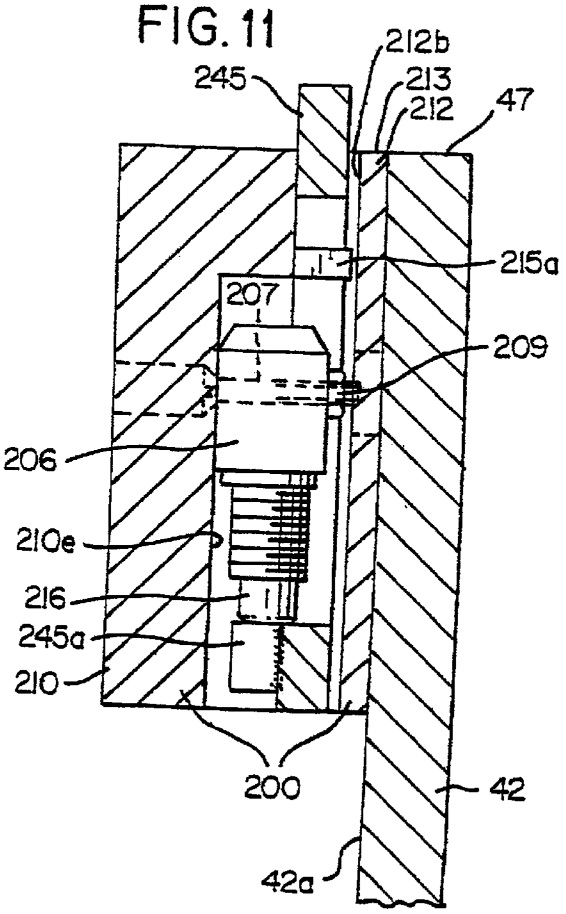
FIG. 11 is a cross-sectional view taken along view line 11—11 in FIG. 10.
Figure 7:
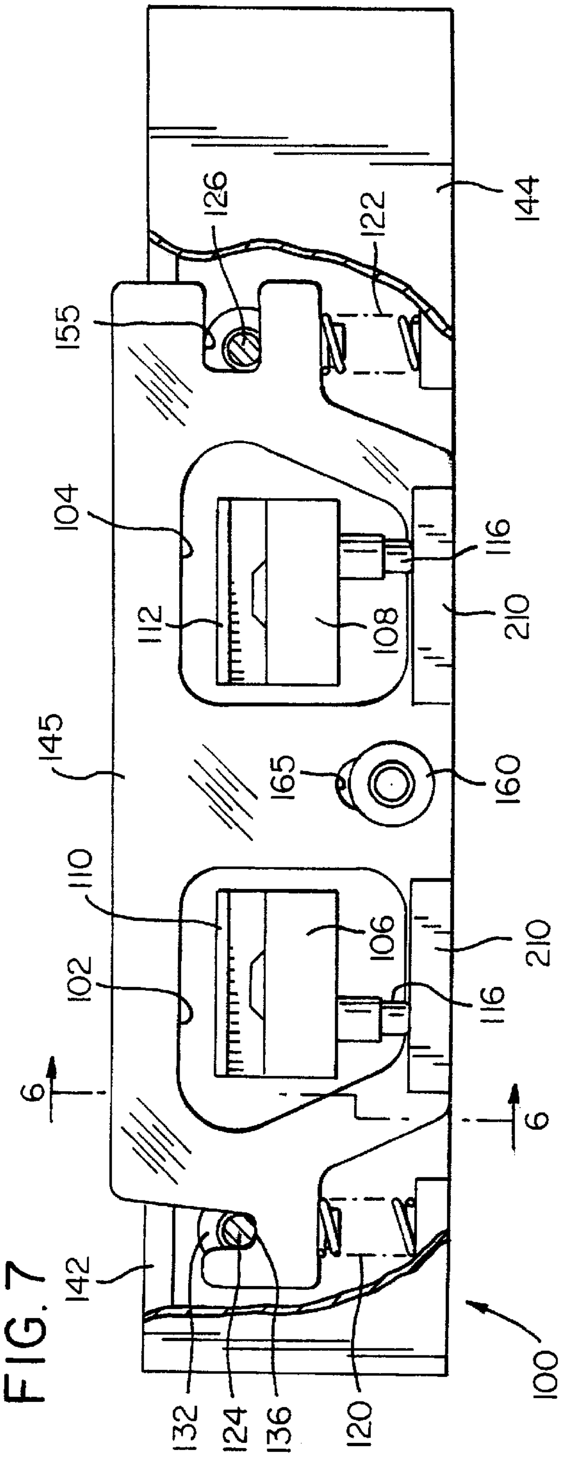
FIG. 7 is a side elevational view of the second embodiment of the invention with a portion of the housing removed.
Figure 8:
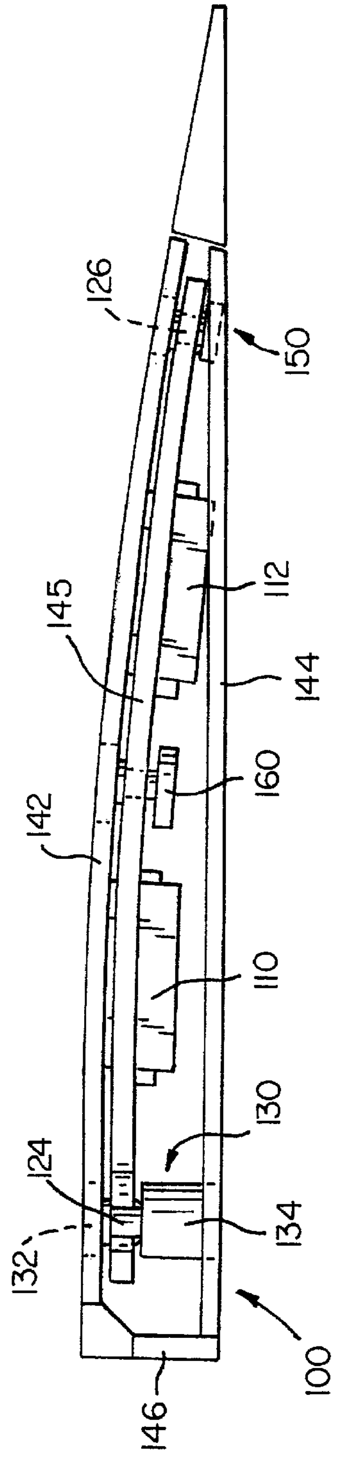
FIG. 8 is plan view of the second embodiment of the invention.

A second embodiment of the invention is shown in FIGS. 6–8. In this embodiment, an actuator bar 145 is contained within a housing 100 having an outer wall 142 which is placed adjacent the inner surface 42*a* of the second side wall 42 of the truck 10. The outer wall 142 is even with or positioned just below the base of the entrance 30. Inner wall 144 and end wall 146 complete the housing 100. The actuator bar 145 is thus placed in the same location as the actuator bar 45 in FIG. 1.

The actuator bar 145 includes a pair of openings 102 and 104 that permit switches 106 and 108 to be mounted to protective shields 110 and 112 which in turn are mounted to the outer wall 142. Each of the switches 106 and 108 is a normally open switch that includes a spring loaded push button switch actuator 116 which rests on a bracket 210 which extends outwardly at the lower part of the actuator bar 145. As long as the actuator bar 145 is in the extended position shown in FIG. 6, the push button switch actuators 116 will be depressed and the switches 106 and 108 will be held closed. On the other hand, if the bar 145 is depressed at either end or in the middle, one or more of the switches 106, 108 will open, activating an alert device. In the illustrated embodiment, only one of the switches 106, 108 needs to be open in order to activate the alert device.

The actuator bar 145 rests on two springs 120, 122. Upward movement of the bar 145 is restrained by shafts 124 and 126. Shaft 124 is a reduced diameter component of a guide pin 130, the outer portion 132 of which extends into a recess in the outer wall 142, the inner portion 134 of which similarly extends into a recess in the inner wall 144. The inner surfaces of the guide pin 130 permit the free and substantially friction-free movement of the bar 145. A vertical slot 136 is formed in the left end of the actuator bar 145, the bottom of which engages the shaft 124 to restrict the upward movement of the left end of the actuator bar 145.

At the right end of the actuator bar 145, the shaft 126 is a component of guide pin 150. It too extends into recesses in the outer wall 142 and inner wall 144. A horizontal slot 155 formed in the right end of the bar 145 limits both the upward and downward travel of the bar 145. The width of the slot is preferably approximately twice the diameter of the shaft 126. Another cylindrical guide pin 160 is located at the center of the actuator bar 145, the shaft of which extends through a slot 165 in the bar. The guide pin 160 is coupled to the outer wall 142.

In this embodiment, as in the embodiment of FIGS. 3–5, should the operator place his or her foot on the ledge 47, it will engage and depress the bar 145, causing one or both of the switches 106, 108 to be actuated, triggering the alert device.

A third embodiment of the invention is shown in FIGS. 9–12. In this embodiment, an actuator bar 245 is contained within a housing 200 comprising a mounting block 210 and a backing plate 212. The backing plate 212 is placed adjacent the inner surface 42*a* of the second side wall 42 of the truck 10, see FIG. 11. The upper surface 213 of the backing plate 212 is even with or positioned just below the entrance base or ledge 47. Conventional fasteners such as bolts 214 pass through openings 212*a* in the backing plate 212 and threadedly engage a boss 210*b* and first and second spacer arms 210*c* and 210*d* of the mounting block 210. The boss 210*b* and the arms 210*c* and 210*d* act as spacers between a back wall 210*e* of the mounting block 210, see FIG. 11, and an inner surface 212*b* of the backing plate 212.

The actuator bar 245 includes a pair of openings 202 and 204 through which first and second micro switches 206 and 208 extend. The switches 206 and 208 are mounted to the block 210 via bolts 207 and nuts 209. Each of the switches 206 and 208 is a normally open switch that includes a spring loaded push button switch actuator 216 which rests on outwardly extending portions 245*a* of the actuator bar 245. As long as the actuator bar 245 is in the position shown in FIGS. 9 and 11, the push button switch actuators 216 will be depressed by the extending portions 245*a* and the switches 206 and 208 will be held closed. On the other hand, if the bar 245 is depressed at either end or in the middle, one or more of the switches 206, 208 will open, activating an alert device. In FIG. 10, the bar 245 is depressed by a centrally located downwardly acting force, represented by arrow 300, such that the switch actuators 216 of both switches 206 and 208 do not contact the two extending portions 245*a* of the bar. Hence, both switches 206 and 208 are open in FIG. 10.

The actuator bar 245 rests on two springs 220, 222. The springs 220 and 222 extend between receiving arms 210*f* of the mounting block 210 and downwardly extending portions 245*b* of the actuator bar 245. The downwardly extending portions 245*b* extend approximately 0.25 inch into the springs 220 and 222, see FIG. 9. A bolt 230 is threaded into each of the receiving arms 210*f*. The bolts 230 also extend into the springs 220 and 222 through ends which are opposite to the ends through which the portions 245*b* extend. The bolts 230 and bar portions 245*b* maintain the springs 220 and 222 properly positioned within the housing 200.

Horizontal slots 240 and 242 are formed in the left and right ends 245*c* and 245*d* of the actuator bar 245. The first spacer arm 210*c* extends into the first slot 240 while the second spacer arm 210*d* extends into the second slot 242. The spacer arms 210*c* and 210*d* limit both the upward and downward travel of the bar 245.

Figure 9:
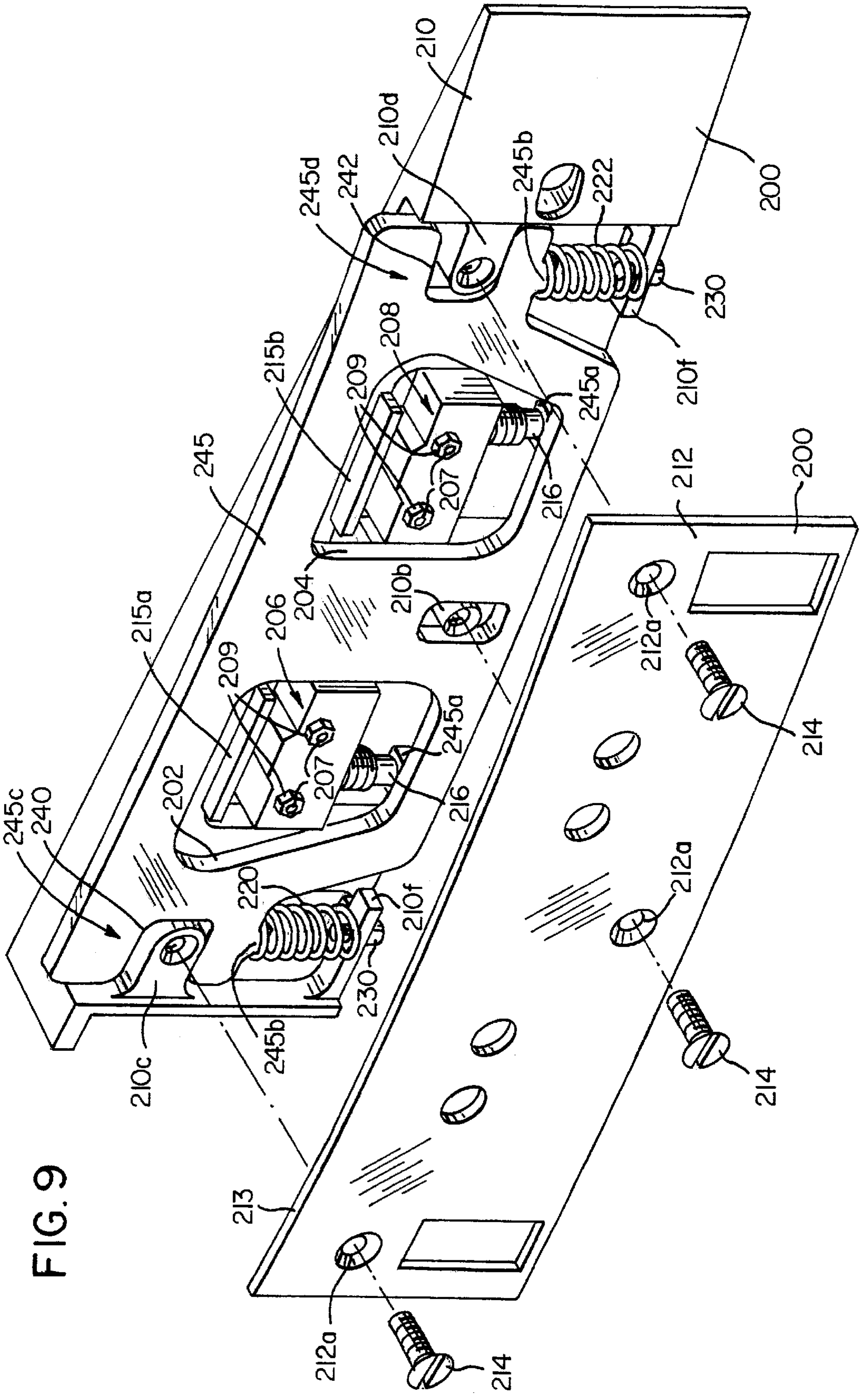
FIG. 9 is an exploded view of an entry switch constructed in accordance with a third embodiment of the present invention.
Figure 10:
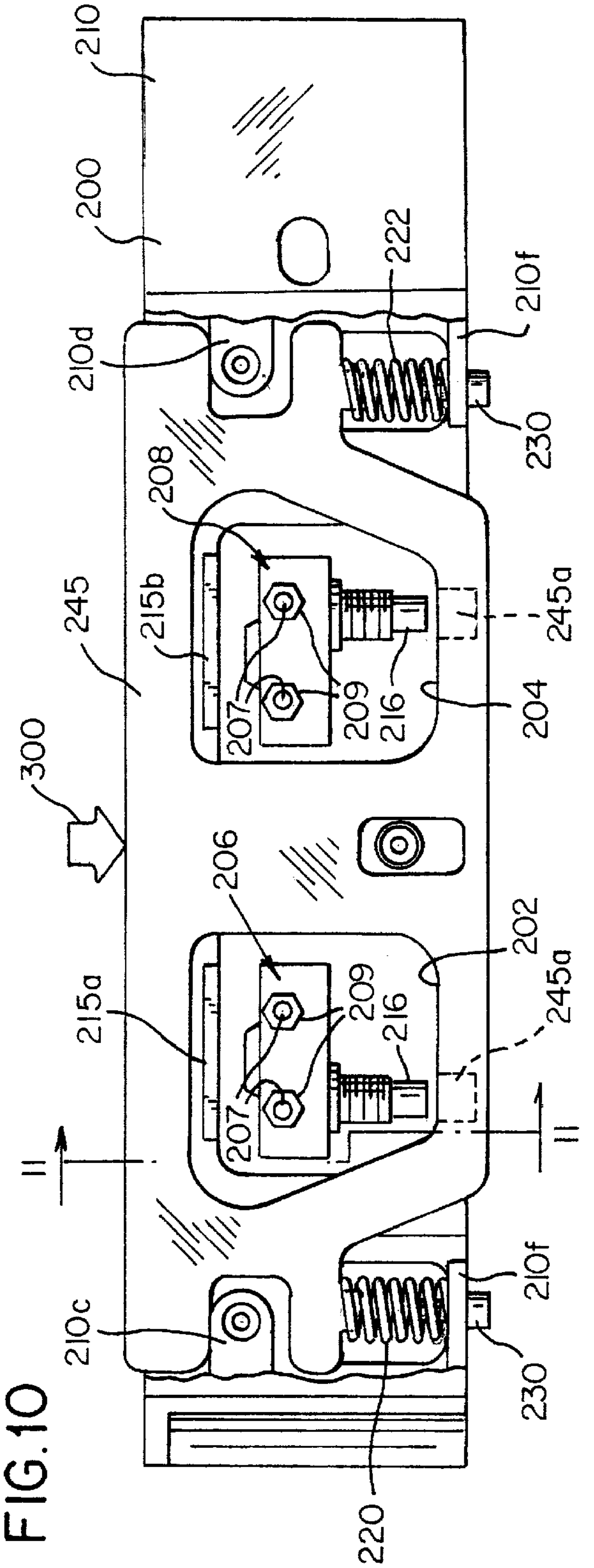
FIG. 10 is a side elevational view of the third embodiment of the invention with a portion of the housing removed.
Figure 12:
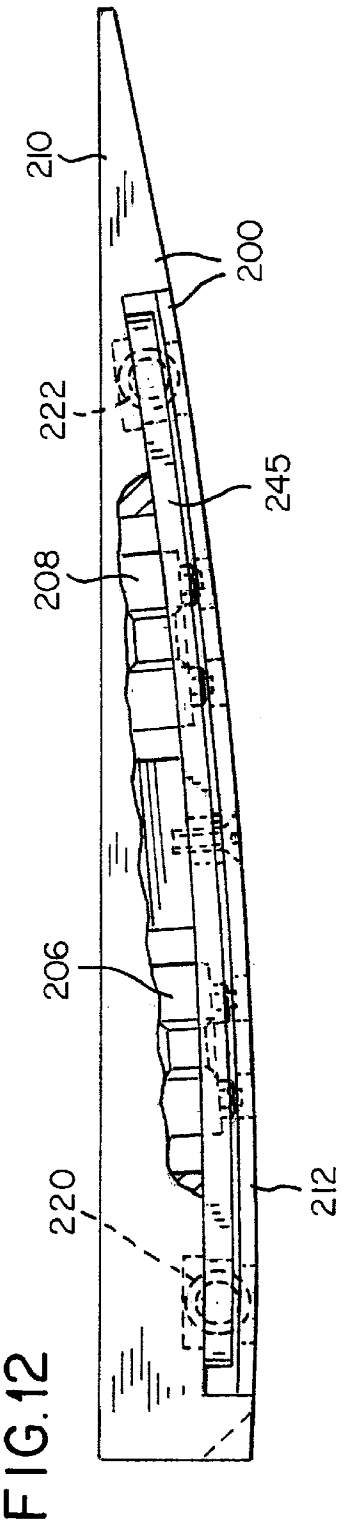
FIG. 12 is plan view of the third embodiment of the invention.

The mounting block 210 further includes first and second protective shields 215*a* and 215*b* which prevent debris and the like from reaching the switches 206 and 208, see FIGS. 9 and 10.

In this embodiment, as in the embodiments of FIGS. 3–8, should the operator place his or her foot on the ledge 47, it will engage and depress the bar 245, causing one or both of the switches 206, 208 to be actuated, triggering the alert device.

Figure 13:
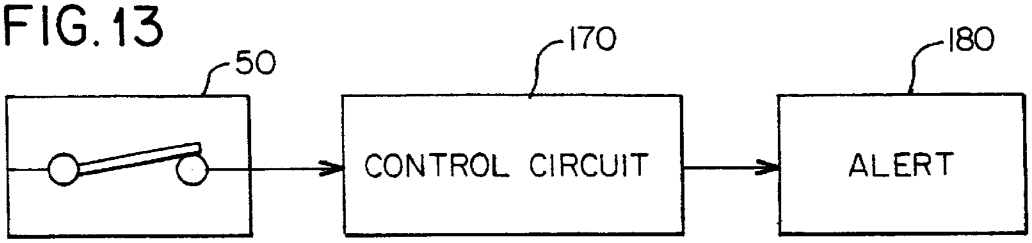
FIG. 13 is a simplified electrical schematic of a control circuit used in the first embodiment of the invention.
Figure 14:
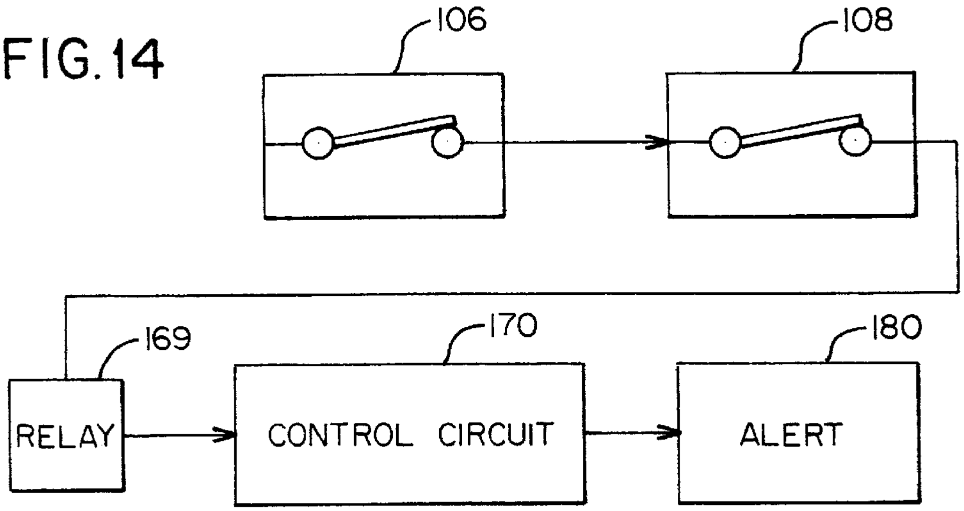
FIG. 14 is a simplified electrical schematic of a control circuit used in the second embodiment of the invention.
Figure 15:
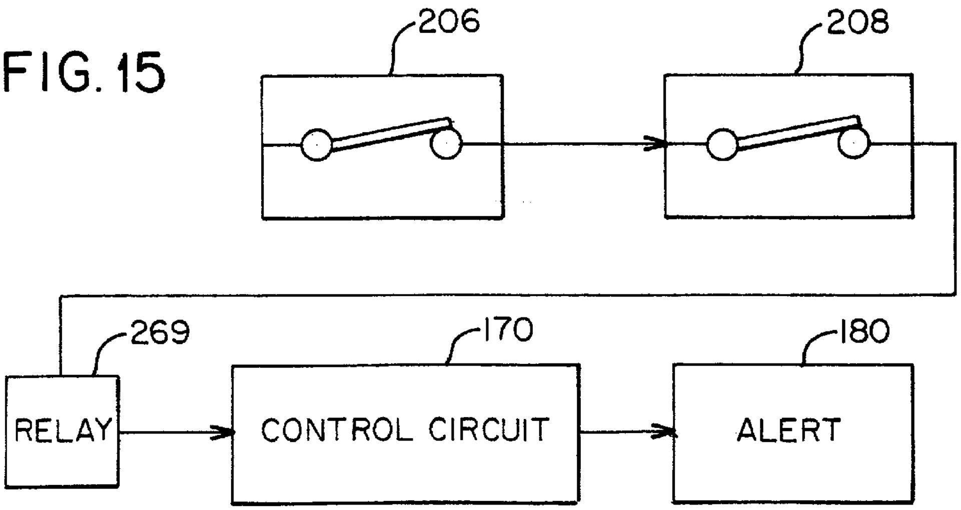
FIG. 15 is a simplified electrical schematic of a control circuit used in the third embodiment of the invention.

In FIG. 13, which is a simplified electrical block diagram, the switch 50 of FIG. 3 is connected to a control circuit 170, which senses the actuation thereof by the foot of the operator, and causes an appropriate alert device 180 to be activated. The control circuit 170 is also capable of detecting when a wire extending from the switch 50 to the control circuit 170 is inoperative, e.g., broken, and causes the alert device 180 to be activated upon detecting that the wire is faulty. Similarly, in Figs. 14 and 15, the switches 106, 108 and 206, 208 are connected to control circuit 170 and alert device 180. As shown in FIG. 14, a single relay 169 is coupled between series connected switches 106 and 108 and the control circuit 170. A single relay 269 is also coupled between series connected switches 206 and 208 and the control circuit 170, see FIG. 15. If one of the switches 106, 108; 206, 208 is opened in response to depression of the bar 145 or the bar 245, respectively, the relay 169 or 269 is released, causing the control circuit 170 to activate the alert device 180. Further, if a wire in the circuit including the switches 106, 108; 206, 208 and the relay 169 or 269 is broken or is otherwise inoperative, the relay 169 or 269 is also released, causing the control circuit 170 to activate the alert device 180. The alert device 180 can take several forms, such as a device for sounding an audible signal, flashing a light or reducing the speed of the truck 10. The alert device may also perform a combination of these actions or perform some other appropriate action.

It is contemplated that the device 24 of the present invention may be incorporated into any materials handling vehicle including a counterbalance fork lift truck (not shown) which includes forks that do not reach outwardly from the mast assembly or material handling vehicles with multiple drive wheels.

What is claimed is:

1. A materials handling vehicle comprising:

a frame including an operator's compartment having an entrance;

a drive mechanism supported on said frame;

a material handling unit coupled to said frame; and an entrance device including an actuator comprising an actuator bar located at an entry ledge of said entrance of said operator's compartment, said device generating an alert signal when a portion of an operator's body engages said actuator.

2. A materials handling vehicle as set forth in claim 1, wherein said device further comprises a micro switch and an alert device, said micro switch generating an actuation signal to said alert device when said actuator bar is engaged by said operator, said alert device generating said alert signal in response to receiving said actuation signal.

3. A materials handling vehicle as set forth in claim 2, wherein said micro switch is a normally closed micro switch.

4. A materials handling vehicle as set forth in claim 3, wherein said actuator bar is spring-biased upwardly.

5. A materials handling vehicle as set forth in claim 2, where said alert device generates an audible alert signal.

6. A materials handling vehicle as set forth in claim 2, where said alert device generates a visual alert signal.

7. A materials handling vehicle as set forth in claim 1, wherein said device further comprises first and second micro switches and an alert device, at least one of said micro switches generating an actuation signal to said alert device when said actuator bar is engaged by said operator, said alert device generating said alert signal in response to receiving said actuation signal from at least one micro switch.

8. A materials handling vehicle as set forth in claim 7, wherein said first and second micro switches are normally open micro switches.

9. A materials handling vehicle as set forth in claim 8, wherein said entrance device further includes one or more springs for biasing said actuator bar upwardly, said actuator bar moving against said one or more springs when engaged by said operator to allow one or both of said first and second micro switches to open.

10. A materials handling vehicle as set forth in claim 1, wherein said actuator bar extends from about ⅛ inch to about ½ inch above said entry ledge.

11. A truck comprising:

a frame including an operator's compartment having an entrance;

a drive mechanism supported on said frame;

a material handling unit coupled to said frame; and an entrance device comprising an actuator bar near an entry ledge of said entrance said device being adapted to generate an alert signal when a portion of an operator's body engages said actuator bar.

12. A truck as set forth in claim 11, wherein said entrance device further comprises a micro switch and an alert device, said micro switch generating an actuation signal to said alert device when said actuator bar is engaged by said operator, said alert device generating said alert signal in response to receiving said actuation signal.

13. A materials handling vehicle as set forth in claim 12, where said alert device generates an audible alert signal.

14. A materials handling vehicle as set forth in claim 12, where said alert device generates a visual alert signal.

15. A truck as set forth in claim 12, wherein said micro switch is a normally closed micro switch.

16. A truck as set forth in claim 15, wherein said actuator bar is spring-biased upwardly.

17. A truck as set forth in claim 12, wherein said entrance device further comprises first and second micro switches and an alert device, at least one of said micro switches generating an actuation signal to said alert device when said actuator bar is engaged by said operator, said alert device generating said alert signal in response to receiving said actuation signal from at least one micro switch.

18. A truck as set forth in claim 17, wherein said first and second micro switches are normally open micro switches.

* * * * *